E. A. KINLEY.
SAW GUIDE.
APPLICATION FILED MAY 5, 1915.
1,187,335.
Patented June 13, 1916.
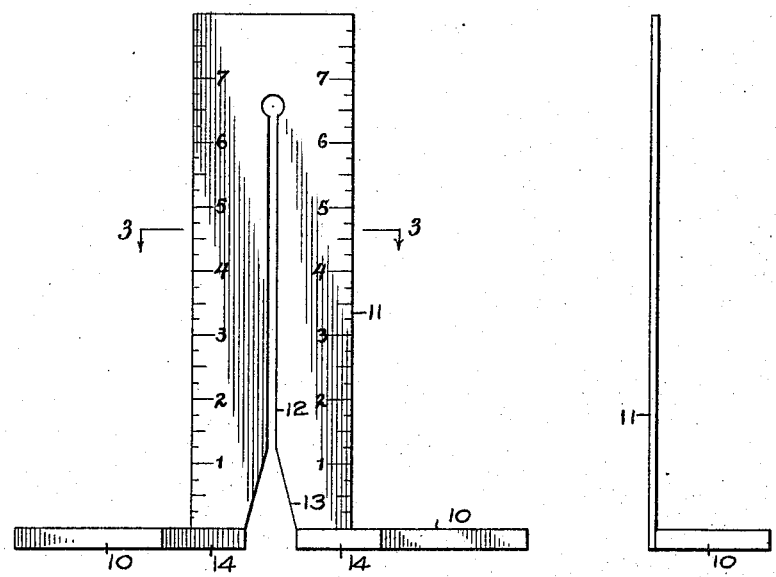
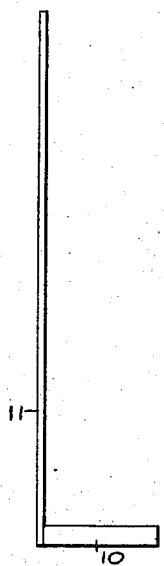
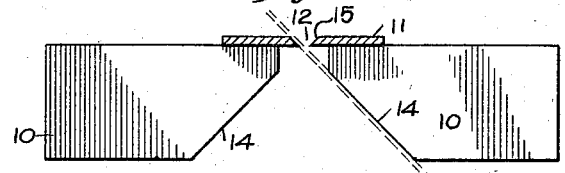
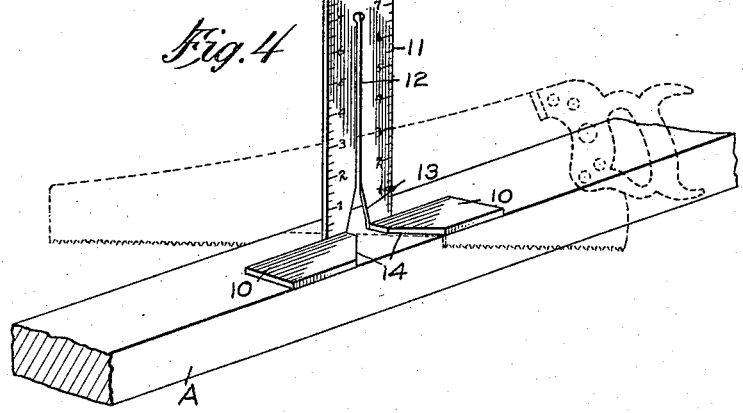
WITNESSES
INVENTOR
Edward A. Kinley.
BY
ATTORNEYS

UNITED STATES PATENT OFFICE.

EDWARD ALBERT KINLEY, OF CLIFTONDALE, MASSACHUSETTS.

SAW-GUIDE.

1,187,335. Specification of Letters Patent. Patented June 13, 1916.

Application filed May 5, 1915. Serial No. 25,918.

*To all whom it may concern:*

Be it known that I, EDWARD A. KINLEY, a citizen of the United States, and a resident of Cliftondale, in the county of Essex and State of Massachusetts, have invented a new and Improved Saw-Guide, of which the following is a full, clear, and exact description.

The object of my invention is to provide a saw guide which may be placed over the saw to rest on the surface of the board, or other material, the guide being adapted to be moved lightly across or along the surface of the board with one hand, while the saw is operated with the other hand, whereby to make an absolutely square cut, regardless of the length of the cut, and thus enable an unskilled person to do as accurate work as a skilled mechanic.

A further important object of my invention is to embody the saw receiving and guiding features of the improved device in elements that constitute the members of a try square, so that the device combines a saw guide and try square.

The invention also has for its object to so form and dispose the saw guiding features of the device, as to adapt itself for use in cutting miters, as well as in making right angular cuts.

The invention will be particularly explained in the specific description following.

Reference is had to the accompanying drawings forming part of this specification, in which similar characters of reference indicate corresponding parts in all the views, and in which:

Figure 1 is a front elevation of a combined saw guide and try square embodying my invention; Fig. 2 is a side elevation thereof; Fig. 3 is a sectional plan view, the section being taken on line 3—3 Fig. 1; and Fig. 4 is a perspective view of the device showing the use of the same as a saw guide.

In constructing a practical embodiment of my invention in accordance with the illustrated example, separate base members 10, 10, are provided, preferably flat, or substantially so, and disposed horizontally. Rising from the base 10 at an edge thereof is a perpendicular blade 11 disposed in a plane parallel with the side edges of the base members and united to the latter. In the blade 11 is a vertical slot 12, the lower end of which preferably flares as at 13. The slot extends through the lower end of the blade, and separating the base members 10 is a space complementary to the slot of the blade. It will thus be seen that an opening of L shape is presented extending horizontally through the base and vertically in the blade 11, to receive a saw as indicated in dotted lines Fig. 4 in sawing a piece of material indicated by the letter A. With the saw blade positioned in the slot 12, and the base 10 resting on the face of a board A, or the like, the kerf made by the saw will necessarily be square with the surface of the board, since the walls of the slot 12 prevent the saw from tilting. The opening between the base sections 10, 10, presents at the opposite edges walls 14 that converge in an inward direction, the walls being at an angle to position the saw for cutting a miter, as indicated in Fig. 4. As best seen in Fig. 3, the walls 15 of the slot 12 are beveled to correspond with the bevel of the walls 14 so that the saw is guided by placing one face thereof against the beveled wall of the slot 12 and the other face against the beveled plate 14 opposite the wall of the slot against which the saw rests. Thus the saw guide will enable an unskilled person to make a square cut either at right angles to the length of the board or to cut a miter joint. In making a long cut in a board or other piece of material, the flat base 10 permits the guide to be moved along the surface of the material as the cutting proceeds, the movement of the device being effected by one hand while the sawing is done with the other. Inasmuch as the horizontal base formed by the members 10, 10, is disposed in front of a face of the blade 11, the said blade and base members constitute the elements of a try square, so that in addition to its functions as a saw guide, the device may be utilized also as a try square. A suitable scale may be produced on the blade 11, as indicated in Figs. 1 and 4.

Having thus described my invention, what I claim as new and desire to secure by Letters Patent, is:

A saw-guide comprising a base plate adapted to rest upon the work and formed with an opening presenting beveled side walls, and an upright plate rigid with the base plate and having a slot to form a saw guide, the walls of the said slot being beveled to correspond with the beveled walls of the base plate to adapt a saw to be guided by placing one face thereof against the beveled wall of the slot and the other face against the beveled plate opposite the wall of the slot against which the saw rests.

In testimony whereof I have subscribed my name to this specification in the presence of two subscribing witnesses.

EDWARD ALBERT KINLEY.

Witnesses:
GEO. H. WOOD,
KATHARINE M. SEXTON.

Copies of this patent may be obtained for five cents each, by addressing the "Commissioner of Patents, Washington, D. C."